United States Patent
Paiz

(10) Patent No.: US 7,058,601 B1
(45) Date of Patent: Jun. 6, 2006

(54) CONTINUOUS OPTIMIZATION AND STRATEGY EXECUTION COMPUTER NETWORK SYSTEM AND METHOD

(76) Inventor: Richard S. Paiz, 16558 NE. 26th Ave., Apt. #2-F, N. Miami Beach, FL (US) 33160

( * ) Notice: Subject to any disclaimer, the term of this patent is extended or adjusted under 35 U.S.C. 154(b) by 0 days.

(21) Appl. No.: 09/514,940

(22) Filed: Feb. 28, 2000

(51) Int. Cl.
*G06F 17/60* (2006.01)
(52) U.S. Cl. ...................................................... 705/37
(58) Field of Classification Search ............ 705/25–40; 703/22
See application file for complete search history.

(56) References Cited

U.S. PATENT DOCUMENTS

| | | | | |
|---|---|---|---|---|
| 6,408,282 B1 * | 6/2002 | Buist | ........................... | 705/37 |
| 6,427,132 B1 * | 7/2002 | Bowman-Amuah | .......... | 703/22 |
| 6,510,419 B1 * | 1/2003 | Gatto | ........................ | 705/36 |
| 6,601,044 B1 * | 7/2003 | Wallman | ..................... | 705/36 |

FOREIGN PATENT DOCUMENTS

EP 0448 800 A1 * 2/1991

OTHER PUBLICATIONS

American Banker, "Chemical Buys Trading Software from Reuters", ( v 154, n 145, p. 14, Dialog file 9, Accession No. 00500233).*

* cited by examiner

*Primary Examiner*—Frantzy Poinvil
(74) *Attorney, Agent, or Firm*—Gold & Rizvi, P.A.; Glenn E. Gold; H. John Rizvi

(57) ABSTRACT

A computer network system within a virtual environment, includes several computers which are networked to each other to function as a single unit, including at least one parent computer synchronizing and delegating tasks among the several computers; so that the unit scans and gathers data from the virtual environment, and processes and organizes the data into an implementable representation of the data. The unit preferably additionally includes at least one dedicated computer for performing a specific task, and at least one processing computer for providing processing power to the unit. The unit alternatively delivers the implementable representation of the data in the form of a report to a user computer terminal and awaits a decision from a human user.

5 Claims, 2 Drawing Sheets

CONTINUOUS OPTIMIZATION AND STRATEGY EXECUTION COMPUTER NETWORK SYSTEM AND METHOD

BACKGROUND OF THE INVENTION

1. Field of the Invention

The present invention relates generally to the field of computer networks, data accessing and processing systems. More specifically the present invention relates to a system of computers linked into a neural network which continuously scans and gathers information from, understands, and interacts with, an environment. The system further consolidates its resources to automatically optimize certain parameters in real time, such as to minimize cost, to shunt functions from computers within the network operating at or near capacity and thus having smaller buffers to other computers having larger buffers to maximize efficiency, and to continuously test and optimize selections offered to a human user. This inventive system has applications in securities trading, in telecommunications call routing and in billing.

The system generally includes a hierarchy of individual computers interlinked to form a single unit known as a hive, some of which are dedicated to performing certain tasks while others provide processing power and still others at the peak of the command hierarchy synchronize and delegate tasks among the various interlinked computers with continuous automatic reevaluation and redirection in real time. The real time interlinking of the computers making up the hive permits execution of strategies pre-set by the user and also permits user updating and changing of the strategies as new information becomes available. The intelligent components of the parent or command computers, which are intelligent data warehouses, interrelate. The synergistic interlinking of these several computers multiplies processing power to a level many times greater than that of a single computer running a particular program, such as an investment program for on-line trading. This system is accessible either through terminals within a business such as a utility or through the internet by subscribers such as through a brokerage house.

Where the system is applied to investing, the computer hive includes individual computers which supply a continuous, real time feed from the stock exchange floor, other individual computers which perform what is known as data mining, gathering information from numerous sources about particular companies whose stock is publicly traded, and still others which process this disorganized and voluminous raw data into rapidly comprehensible indicia for human monitoring and evaluation. Other individual computers may be included which provide live interaction with a broker employed by the brokerage house who provides general advice and legally necessary authorization to the user for trades for a pre-established length of time within pre-agreed cost variation parameters.

2. Description of the Prior Art

There have for some time been individual computers loaded with programs for executing stock trades while on-line and for routing telephone calls and generate billing for telephone and electrical utilities, which rely upon the processing power and data within the single computer. A problem with these single computer applications has been that more processing power and data access capability are needed, together with web and virtual world access.

What is further needed is a system which integrates data flow between production and management by permanently scanning the environment and converting the information into data mining, trending or statistical reports on system integrity. Such a system should provide improved resource logistics, real time data mining, trending and usage analysis.

It is thus an object of the present invention to provide a computer network system which continuously optimizes certain parameters, such as to achieve cost minimization.

It is another object of the present invention to provide such a network system which is better than e-trading because it eliminates the fifteen second wait.

It is still another object of the present invention to provide such a network system which can provide on-line trading access and gather and process data about companies through a live virtual world server without need for costly software or for the ordinary live feed with a high subscription cost.

It is yet another object of the present invention to provide such a network system which provides visual access to a trading house broker for advice and for required trading authorization to the user, the broker being denied information about commissions on individual stocks to prevent churning and thus make trading friendly to the small investor.

It is a still further object of the present invention to provide such a network system which incorporates old technology and converts it into common form, so that existing equipment is not wasted and the cost of updating is minimized.

It is finally an object of the present invention to provide such a network system which provides such trading information and real time trading ability at a nominal cost to the end user, due to advertising revenues, and thus which makes available to everyone what has until now been available only to large companies.

SUMMARY OF THE INVENTION

The present invention accomplishes the above-stated objectives, as well as others, as may be determined by a fair reading and interpretation of the entire specification.

A computer network system is provided within a virtual environment, including several computers which are networked to each other to function as a single unit, including at least one parent computer synchronizing and delegating tasks among the several computers; so that the unit scans and gathers data from the virtual environment, and processes and organizes the data-into an implementable representation of the data.

The unit preferably additionally includes at least one dedicated computer for performing a specific task, and at least one processing computer for providing processing power to the unit. The unit alternatively delivers the implementable representation of the data in the form of a report to a user computer terminal and awaits a decision from a human user.

The system preferably additionally includes a strategy program within the at least one parent computer for receiving and evaluating the implementable representation of the data and for delivering a command to another computer among the networked computers based upon the evaluation of data, so that the scanning, gathering, organizing and evaluating and delivery of commands occurs substantially in real time as conditions within the environment change. Where the virtual environment includes call links meeting at several junction points and an operating computer at each of several of the junction points, the system preferably additionally includes several simulation computers within the virtual environment imitating the function of the operating computers within the environment and linked to the unit, where at least a portion of the data gathered from the virtual environment is test data generated by the simulation computers.

The unit optionally is linked to a human user computer terminal. The virtual environment optionally includes a broker computer terminal through which a broker communicates live with a human user. The virtual environment optionally includes a stock exchange data base and the data gathered from such a virtual environment includes live information feed from a stock exchange floor showing in substantially real time information about securities trading. The virtual environment optionally includes company data sources containing data about companies which have issued stock which is traded on the stock exchange and the data gathered from such a virtual environment includes data from the company data sources. The virtual environment optionally includes news service data sources containing data about current events in the world and the data gathered from such a virtual environment includes data from the news service data sources. The virtual environment optionally includes an internet chat room which provides real time communication among multiple users and between users and a broker.

The system preferably additionally includes a strategy execution program which stores parameters input by a human user for generation of certain commands in the event that data received from the virtual environment produces indicia meeting one of the parameters. Where the parameters are fluctuation levels in the price of certain stocks, the certain commands are directives to the human user to execute a stock trade.

Where the virtual environment is a communications network, and where the operating computers are located at junction points of links within the communications network for selecting and connecting call links through the communications network, the simulation computers preferably are in connected in parallel with the operating computers at each of the junction points. Thus, the simulation computers imitate the functions of the operating computers to perform advance test routings of the calls and to send information back to the unit for comparison and evaluation, and the unit identifies and directs a call through a series of call links which optimize a certain parameter for the call in substantially real time. The unit preferably additionally computes a bill for each call and generates a billing statement for delivery to the user. The system preferably additionally includes devices for video and audio taping the human user. The networking of the unit computers preferably includes direct hyperlinks.

A method of optimizing parameters of tasks executed within a virtual environment is provided using a system including several computers which are networked to each other to function as a single unit, including at least one parent computer synchronizing and delegating tasks among the several computers; including the steps of scanning the virtual environment; gathering data from the virtual environment; and processing the data into an implementable representation of the data.

The method preferably additionally includes the additional steps of delivering the implementable representation of the data in the form of a report to a human user through an end user computer terminal; and receiving instructions from the human user based upon the content of the report. The system preferably additionally includes a strategy program within the at least one parent computer for receiving and evaluating the implementable representation of the data and for delivering a command based upon the evaluation of data to networked computers, including the additional steps of receiving into the unit and evaluating the implementable representation of the data; and delivering a command to a computer within the virtual environment based upon the evaluation of data in substantially real time. The method optionally includes the additional step of transmitting trading authorization for trading within certain parameters over a certain length of time, from a broker to an end user computer. The method preferably includes the additional step of delivering advertising messages from the unit to the end user computer terminals.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
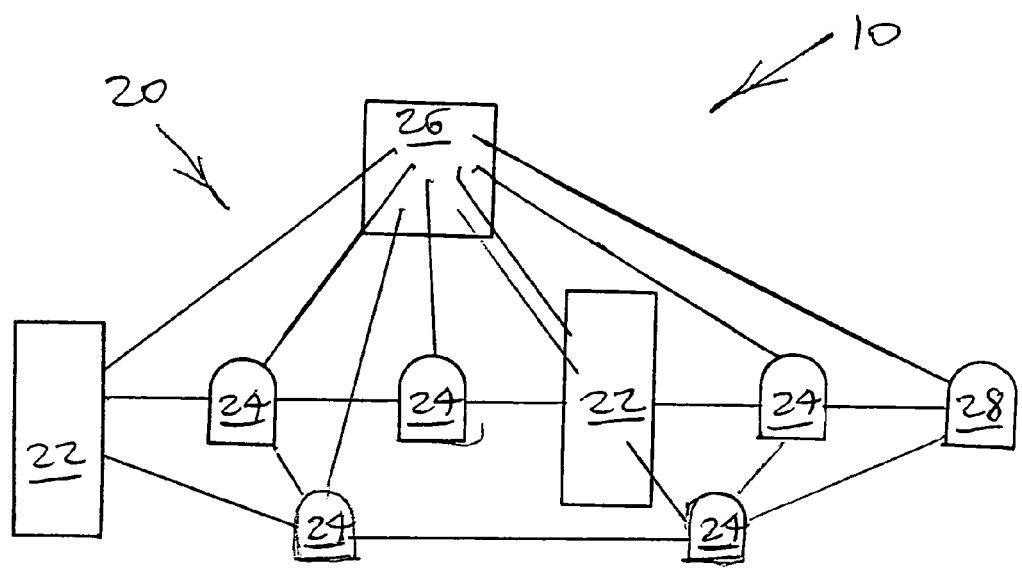
FIG. 1 is a schematic representation of the hive or unit formed of the interlinked computers.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

The System Generally

Figure 3:
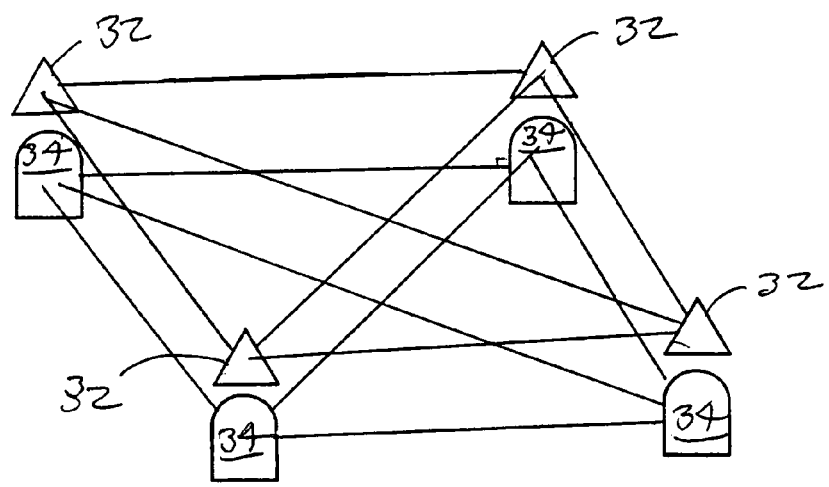
FIG. 3 is a schematic representation of a portion of the system as applied to telecommunications, providing a simulation computer operating in parallel with each operating computer so that chaining can be accomplished without diminishing the processing power of the actual operating computers in the telecommunications network.
Figure 2:
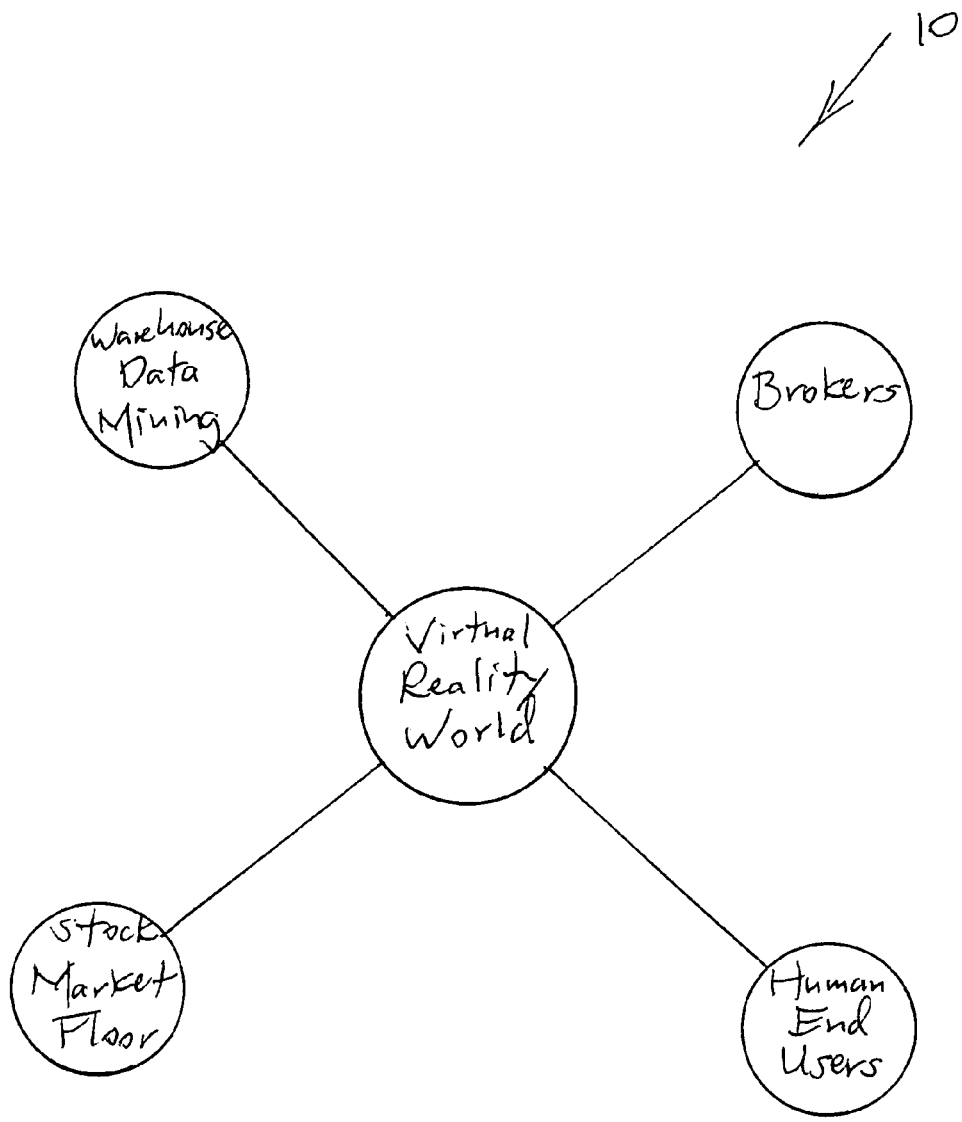
FIG. 2 is a schematic representation of the structure of the system within the virtual world.

Referring to FIGS. 1–3, a system 10 of computers linked to form a neural network is disclosed, including a hive 20 made up of a hierarchy of interlinked individual computers functioning as a unit, the hierarchy including dedicated computers 22 which perform certain specific tasks, processing computers 24 which provide processing power to the unified hive, and parent computers 26 at the peak of the command hierarchy which synchronize and delegate tasks among the other interlinked computers 22 and 24 while providing continuous and automatic reevaluation and redirection in real time. The interlinking of the computers 22–26 making up the hive 20 permits execution of strategies pre-set by the user and also permits user updating and changing of the strategies as new information becomes available. The synergistic interlinking of these several computers multiplies processing power to a level many magnitudes greater than that of a single computer running a particular program, such as an investment program for on-line trading. This system 10 is accessible either through user terminals 12 within a business such as a utility or through the internet by subscribers such as through a brokerage house.

First Preferred Embodiment

When applied to investing, the computer hive 20 includes individual dedicated computers 22 which supply a continuous, real time feed from the stock exchange floor, other dedicated computers 22 which perform what is known as data mining, gathering information from numerous sources about particular companies whose stock is publicly traded, processing computers 24 which process and filter the disorganized and voluminous raw data into rapidly comprehensible indicia for human monitoring and evaluation, and either the same or other individual computers which provide live interaction with a broker employed by the house who provides general advice and legally necessary authorization to the end user for trades for a pre-established length of time within pre-agreed cost variation parameters. The user is video and audio taped, and the user identifies himself or herself to fully comply with trading rules regarding authorization. The length of time might, for example, be six hours and a range price range variation might, for example, be plus or minus five percent to trigger selling or buying. All end users have to have a brokerage house account.

Mined data is provided by direct hyperlink (DHL) rather than through a modem, because of larger band width. Mined data includes up to the minute information about inflation, SEC reports, the cost of money, various relevant news reports and exchange rates. In all, there preferably are eight types of feed supplied through the computer hive. The service optionally additionally includes an investors virtual chat room in which fellow traders and friends are able to interact and discuss with audible voices the market and their moment to moment investing decisions. The broker is able to give brief talks as well as full length seminars in the virtual chat rooms and interact with account holder users and answer questions. Since the system is part of a world wide network, an available broker can be provided at any time during the 24 hour day, because house brokers would be spread throughout the world and the parent computers 26 automatically monitor and test for free on-line brokers throughout the network. In other words, since it is daytime somewhere in the world at any given moment, many broker would be on-line at any given moment, at least a few of whom would likely be available for consultation.

All this real-time information delivery and massive processing power, and the ability to instantly execute a trade, provide the small investor with the same tools and speed available to the largest trading houses. The cost of individual user subscriptions can be minimized or eliminated by selling advertising on the feed supplied to each subscriber, which may be displayed periodically within a window on the end user computer 28 monitor screen. As a result of the worldwide breadth of the internet, such advertising would reach virtually every place in the world. Thus the high value and salability of the advertising time could be so great that more than substantial profits would accrue to the brokerage house providing the service to permit minimization of subscriber fees.

In order to prevent churning, data provided on the computer monitor of each house broker is restricted to the extent that it excludes information about the commission available to him or her for each particular stock. Thus the advice provided by the broker is assured to be freed from any self-interested bias and reaches the end user in an uncorrupted state. Ideally this method of freeing broker advice from churning might be adopted as a trading rule through the appropriate government agencies. The individual brokers still earn whatever commissions are available on the stocks actually traded, and may earn a significant salary as well as a result of advertising revenue.

Second Preferred Embodiment

When applied to telecommunications, the parent computers 26 continuously search for the most efficient series of links for each telephone call, known as a vector. They continuously search for vectors which maximize capacity, and continuously search for the providers giving the best rate at each moment to minimize the cost of each call. The rates of various providers may vary slightly from moment to moment depending on the varying call load experienced by each given provider.

System 10, for example, re-routes calls to remote locations if local facilities are near capacity. This re-routing has a cost, but the parent computer 26 weighs costs and suggests the most economical route to Italy or France, for example, so that the cost of the call is ultimately minimized. Calls are filtered to let just certain ones through, whether to MCI, AT&T or to some other carrier.

The determination of minimized cost is made through a procedure known as forward chaining, in which the parent computer 26 effectively reaches out to gather information about alternative routes and then evaluates and compares the resulting data. There is continuous feedback from the parent computer 26 to the subservient computers 22 and 24 to achieve forward chaining. To accomplish this, the telephone network may include a simulation computer 32 at each call link juncture, in addition to the operating computer 34 at that juncture. See FIG. 3. The simulation computers 32 mimic the functions of the operating computers 34 so that a test signal can be sent from the parent computer 26 through the simulation computers 32 without diminishing the processing power of the operating computers 34. The cost continuous determinations also permits automatic generation of customer bills for each call. The automatic billing function is also applicable to generating bills for electric utility customers.

System 10 integrity is monitored for rapid detection of malfunctions, so that proactive preventative maintenance is provided, thereby minimizing downtime. Once again, hyperlinks are preferred over modems due to their larger band width.

Method

In practicing the invention, the following method may be used. The method of optimizing parameters of tasks executed within a virtual environment using the above-described system includes the steps of scanning the virtual environment; gathering data from the virtual environment; and processing the data into an implementable representation of the data. Additional steps include delivering the implementable representation of the data in the form of a report to an end user computer terminal; and receiving instructions from the end user based upon the content of the report. Where the system additionally includes a strategy program within the hive for receiving and evaluating the implementable representation of the data and for delivering a command based upon the evaluation of data to networked computers, the method includes the additional step of receiving into the hive 20 and evaluating the implementable representation of the data; and delivering a command to a computer within the virtual environment based upon the evaluation of data substantially in real time.

Where the system is applied to securities trading, the method preferably includes the step of transmitting trading authorization for trading within certain parameters over a certain length of time from a broker to an end user computer 28 terminal. Another preferred method step is that of delivering advertising messages from the hive 20 to the end user computer 28 terminals.

System 10 performs at every binary time interval a network diagnostic of the entire network and may "instantiate" new routes in the case of a system failure or misuse of existing resources. The result is lower downtimes because a repair crew is warned virtually immediately and the system is maintained with a proactive preventative maintenance.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A non-centralized, hierarchically-arranged, multi-tiered distributed parallel computer network system incorporating software for imparting artificial intelligence to system hardware and communicatively coupled to a plurality of financial exchanges and at least one real time news source for facilitating the real-time trading of securities offered through the exchanges by an end user from an end user computer terminal, the computer network system comprising:

a first plurality of computers forming a first-tier computer cluster communicatively coupled to a continuous real time raw data feed from trading floors of said plurality of financial exchanges, each of said first plurality of computers of said first-tier computer cluster configured to continuously process and filter said raw data into primed data comprehensible for human monitoring and evaluation;

a second plurality of computers forming a second-tier computer cluster hierarchically superior to said first tier computer cluster and directly communicatively coupled thereto for receiving real-time updates of the primed data generated by said first tier computer cluster, said second tier computer cluster further coupled to a continuous real-time news, data and information source, and particularly programmed to analyze and parse through said news, data and information in real time to determine portions thereof having relevance to the valuation and trading of said securities based upon the most recent primed data received from said first tier computer cluster;

a third plurality of computers forming a third-tier computer cluster hierarchically superior to said second tier computer cluster and particularly configured and arranged within said computer network system to receive real time updates of the primed data generated by said first tier computer cluster and real-time updates of the relevant news, data and information set generated by said second-tier computer cluster, said third-tier computer cluster particularly arranged and configured within said network for continuously monitoring and analyzing the primed data generated by the first-tier computer cluster, and the relevant news, data and information set generated by the second-tier computer cluster, at least one of said third plurality of computers having a strategy execution computer program installed and running thereon for comparing the primed data to end user-defined parameters in order to automatically generate one or more trading instructions, and to provide technical analysis and fundamental analysis, upon the occurrence of said primed data falling within said parameters;

a fourth plurality of computers forming a fourth-tier computer cluster hierarchically superior to said third tier computer cluster and particularly configured and arranged within said computer network system to enable live interaction between said end user computer terminal and one or more security broker terminals, the fourth-tier computer cluster particularly arranged and configured within the network system to receive real time updates of the news, data and other information generated by the subordinate first-, second- and third-tier computer clusters, at least one of said fourth plurality of computers having a computer program installed and running thereon for proactively determining the information being tracked by said end user, customizing said news, data and other information based upon the particular information being tracked, and automatically communicating updates of said news, data and other information to said end-user computer terminal; and, a fifth plurality of computers forming a summit-tier computer cluster hierarchically superior to said first-, second-, third- and fourth-tier computer clusters and directly communicatively coupling said fourth-tier computer cluster with said securities exchanges in a manner enabling direct execution of securities trades through said exchanges by said end user, said summit-tier computer cluster coordinating, controlling, managing and synchronizing the tasks each of the subordinate computer cluster tiers.

2. The computer network system recited in claim 1, wherein said first-, second-, third-, fourth- and summit-tier computer clusters cooperate to continuously scan said primed data to determine patterns of behavior or trends of data fluctuation potentially affecting the trading of said securities, said first-, second- and third-tier computer clusters continuously updating said patterns and trends and communicating said updated patterns and trends to said end-user computer terminal, the fourth- and summit-tier computer clusters managing, controlling, synchronizing and load-balancing tasks and resources amongst the individual computers of the system.

3. The computer network system recited in claim 1, wherein each one of said second- and third-tier computer clusters are further arranged and configured within said system for delegating tasks among at least one subordinate computer cluster.

4. The computer network system recited in claim 1, wherein said fourth-tier computer cluster incorporates computer software programming for verifying and validating that each said trading transaction is executed in accordance with pre-established governmental securities trading guidelines.

5. The computer network system recited in claim 4, wherein said summit-tier computer cluster is arranged and configured for transmitting trading authorization for trading within predetermined parameters for a predetermined period of time from a broker to said end user computer upon receipt of an audio and/or video recorded confirmation and verification and validation that a corresponding potential trade has been verified and validated to be in accordance with said pre-established governmental securities trading guidelines.

* * * * *